(12) United States Patent
Baumuller

(10) Patent No.: US 6,534,148 B1
(45) Date of Patent: Mar. 18, 2003

(54) MACHINE FOR MAKING CUSHIONING DUNNAGE PRODUCT, STOCK MATERIAL FOR FEEDING SUCH MACHINE AND METHOD

(75) Inventor: Theodore Baumuller, Schweighouse sur Moder (FR)

(73) Assignee: Naturembal S.A., Bauxwiller (FR)

( * ) Notice: Subject to any disclaimer, the term of this patent is extended or adjusted under 35 U.S.C. 154(b) by 1228 days.

(21) Appl. No.: 08/726,643

(22) Filed: Oct. 7, 1996

Related U.S. Application Data

(63) Continuation-in-part of application No. 08/426,468, filed on Apr. 19, 1995, now abandoned, and a continuation-in-part of application No. 08/690,743, filed on Aug. 1, 1996, now Pat. No. 5,766,736.

(30) Foreign Application Priority Data

Jul. 16, 1996 (FR) .............................................. 96 09045

(51) Int. Cl.⁷ ................................................. B32B 3/04
(52) U.S. Cl. ...................... 428/126; 156/183; 156/199; 156/204; 428/121; 428/154; 493/381
(58) Field of Search ................................. 156/183, 199, 156/204; 428/121, 126, 154; 493/381

(56) References Cited

U.S. PATENT DOCUMENTS

| | | | |
|---|---|---|---|
| 2,711,781 A | 6/1955 | Langer | |
| 2,786,399 A | 3/1957 | Mason | |
| 2,819,488 A | 1/1958 | Gimbel | |
| 3,164,069 A | 1/1965 | Wilkie | |
| 3,337,906 A | 8/1967 | Kaluza | |
| 3,398,223 A | 8/1968 | Schatz | |
| 3,509,798 A | 5/1970 | Johnson | |
| 3,540,076 A | 11/1970 | Urbutis | |
| 3,603,216 A | 9/1971 | Johnson | |
| 3,650,877 A | 3/1972 | Johnson | |
| 3,655,500 A | 4/1972 | Johnson | |
| 4,085,662 A | * | 4/1978 | Ottaviano .................... 493/381 |
| 4,287,846 A | 9/1981 | Klein | |
| 4,750,896 A | 6/1988 | Komaransky | |
| 4,937,131 A | * | 6/1990 | Baldacci et al. ............. 428/126 |
| 4,968,291 A | 11/1990 | Baldacci | |
| 5,143,776 A | * | 9/1992 | Givens ........................ 428/194 |
| 5,188,581 A | 2/1993 | Baldacci | |

FOREIGN PATENT DOCUMENTS

| | | |
|---|---|---|
| DE | 1303455 | 12/1971 |
| DE | 9213273 | 12/1992 |
| EP | 0427834 | 9/1993 |
| EP | 0679504 | 11/1995 |
| EP | 0679504 | 9/1996 |
| FR | 2100259 | 3/1972 |
| FR | 2483321 | 12/1981 |
| GB | 1091588 | 11/1967 |
| GB | 1150439 | 4/1969 |

* cited by examiner

*Primary Examiner*—John J. Gallagher
(74) *Attorney, Agent, or Firm*—Wood, Herron & Evans, L.L.P.

(57) ABSTRACT

The invention provides a method of making cushioning dunnage comprising the steps of providing an elongated band of stock material having lateral edges and a longitudinal axis, the band of stock material being formed from at least two elongated paper webs adhered together along the lengths of the webs by glue applied to one of the webs in a gluing area having a length along a longitudinal axis of the one web and a width transverse to the one web longitudinal axis, the transverse location of glue applied to the gluing area varying as a function of the longitudinal location along the gluing area; driving the band longitudinally; folding the lateral edges of the band laterally inwardly; alternatingly crumpling the band longitudinally on first one side of the longitudinal axis of the band and then on the other side of the longitudinal axis of the band to form pleats in the band; and connecting the pleats in the band by compressing the band through the thickness of the band. Cushioning dunnage made according to the method is also provided.

13 Claims, 6 Drawing Sheets

MACHINE FOR MAKING CUSHIONING DUNNAGE PRODUCT, STOCK MATERIAL FOR FEEDING SUCH MACHINE AND METHOD

RELATED APPLICATIONS

This application is a continuation-in-part of application Ser. No. 08/426,468 filed Apr. 19, 1995 titled "Improvements To The Machine And Methods For Making Cushioning Dunnage Products By Crumpling Paper", now abandoned. This application is also a continuation-in-part of application Ser. No. 08/690,743 filed Aug. 1, 1996 (as Express Mail No. EH045086766US), titled "Stock Material For Feeding Machines For Making Dunnage Products", now U.S. Pat. No. 5,766,736. Both of these applications are assigned to the assignee of the present invention and are hereby incorporated by reference herein as if fully set forth in their entirety.

FIELD OF THE INVENTION

This invention relates to machines for and methods of making cushioning dunnage product from stock material. The invention also relates to stock material for feeding the machine, as well as a method and a mechanism for producing this stock material. Lastly, the invention relates to a method of producing cushioning product via use of the stock material in the machine, and to product produced by the method.

BACDGROUND OF THE INVENTION

Machines for making cushioning dunnage product have existed for a some time. U.S. Pat. No. 3,603,216 describes one such machine in which a multi-ply paper-like material is guided firstly in a converging chute which is a truncated pyramid in shape and which becomes thinner downstream so that the longitudinal edges of the material are rolled inwardly, and then secondly in a gear assembly between which the material travels. The central band of the resulting strip is grabbed by the teeth of two cooperating gears and pulled downstream as it is nipped by these gears. The two gears are mounted with spring means such that the gears are urged toward one another. The material is simultaneously compressed or coined, and the various layers are pressed together forming the coined strip. The product made by the machine comprises consequently a central coined strip and two pillow-like edges, and is suitable for padding shipping cases or boxes.

The main characteristic of this type of machine is that the same gears simultaneously pull the paper-like material downstream, and crumple and coin the multiply strip to connect the inwardly rolled edges to the central strip.

In practice, this plurality of functions can cause problems, these have been solved by various solutions, none of which is entirely satisfactory. Thus, when the pressure exerted on the sheets is sufficient to pull them downstream, the said sheets sometimes tear. On the other hand, if the pressure is reduced, the central strip is not held together firmly enough and sometimes the pillow-like edges come open or unroll, thus the material can consequently not be used as a cushioning dunnage product.

One of the proposed solutions to reconcile the two above requirements is described in U.S. Pat. No. 4,968,291 and is a gear-like stitching assembly having gear like members disposed in a meshed condition, characterized in that the teeth of at least one of the gear-like members have projections thereon for perforating the multi-ply formed material along the central coined section of the produced pad-like cushioning dunnage product.

However, the central coined area becomes more fragile, particularly where the projections of the teeth have made perforations, which are in fact beginnings of tears. The described machine can then only be used with superimposed sheets of high quality kraft paper, which is also much more expensive.

It is therefore one object of the present invention to provide a cushioning dunnage producing machine which does not suffer from the aforementioned disadvantages.

It will be appreciated then that machines producing dunnage product utilizing paper fed into the machine generally crumple the stock material running in a continuous strip, the crumpling being sometimes combined with other operations increasing the volume of the material. The final product must however be maintained in its final state, so that one can handle it without altering it. It must especially keep its resiliency and elasticity, imparted to it by the crumpling operation.

A double-layer band of paper leads to better results than a single-layer band of paper. This is because of the improved rigidity of the continuous strip. Also, the final dunnage product has greater volume due to the spaces appearing between the layers.

For maintaining the stability of the dunnage product, for improving the mechanical characteristics of the two layers and for making easier their passage in and through the dunnage producing machines, it is however preferable that the two layers be fixed to one another, for instance glued together. The easiest and least expensive way to glue them together would be by way of central axial linear gluing. However, due to the specific nature of the operations performed in combination with the crumpling operation to make the final dunnage product, it is preferable to increase the width of the glued area, or to glue the layers in two transversely distinct places. To get the maximum volume, it is moreover better not to glue the lateral edges of the two layers.

one solution could be to glue the two layers lengthwise in two parallel lines located in the central area, but such a technique would increase the production difficulties and hence production costs.

Another problem associated with the linear gluing is that it causes the formation of rolls increasing the thickness of the strip in the glued area, and it is then more difficult to roll or transversely fold the material, these operations being however needed for instance for stocking the material.

When the glue is applied continuously to the webs, i.e. linearly as described above, additional difficulties are encountered. The drying time is high, which decreases production speed, since to stock the material it must be wound around a roll, which winding action, if done prior to the glue having fully dried, can damage or deform the glued area of each layer. Further, such action can force the glue completely through the layers which is extremely undesirable as when the glue dries the layers of the roll all become adhered together.

Accordingly, another object of the invention is to provide a continuous material with at least two superimposed and glued layers, wherein the glued area does not form a roll which could prevent the material from being rolled or folded in good condition.

Yet another object of the invention is to provide for the production of the stock material while making significant glue savings on one hand, and allowing on the other hand the use of a large range of paper, not limited to high quality paper.

A further object of the invention is to provide for producing the material at a high production rate.

A still further object of the invention is to provide a solution which can easily be applied to the mechanisms making such multilayer materials, as well as a method of implementing this solution.

SUMMARY OF THE INVENTION

The present invention provides a machine of a very different design without the aforementioned drawbacks, with a combination of means for producing a an improved cushioning dunnage product with much higher cohesion. The product is made of recycled paper, which is much cheaper than higher quality paper, yet without the risk of tearing.

The machine performs the functions of pulling downstream the paper-like strip, crumpling and connecting it, in order to make a high cohesion product, the functions being provided by separated parts, each one being adapted to the function to be performed, and thus ensuring total efficiency of the machine.

The components providing for the pulling downstream are two superimposed wheels. One wheel of the pair of wheels is a cylindrical shaped wheel, called a pulling wheel. The median portion of this pulling wheel includes an annular groove, while the edge portions are milled or knurled, these edges including flat parts along their periphery, located so that the flat parts of one edge portion face the non flattened parts of the other edge portion. The other wheel, called a support wheel, also has an approximately cylindrical shape, and includes a median portion with a toric strip corresponding to the annular groove of the upper wheel, and two cylindrical edge portions in contact with the non flattened areas of the upper wheel.

The superimposed sheets of the multi-ply formed material are nipped and driven between the cylindrical portions of the pulling wheel and the non flattened parts of both the edge portions of the support wheel, i.e. alternately the right and the left edge portions. The sheets are consequently not pulled downstream axially, but alternately by the left portion and by the right portion, with respect to the central axis, the resulting lateral dissymetry being balanced by the median hollow flexible area created between the toric strip and the annular groove. Due to this driving mode, the efforts exerted on the sheets do not result in tearings thereon, because of the lack of stresses, except the stress for the axial pulling downstream.

The components performing the connection of the superimposed sheets are a second set of two wheels, downstream from the first set of two wheels. One wheel of the second set is castellated and the other wheel of the second set is smooth, the periphery of the teeth of the one wheel rotating on the smooth surface of the other wheel, and the superimposed sheets being then compressed by the teeth acting against the smooth surface. There are no risks of tearing, because the sheets are not deformed between gear like members meshing together.

The components performing the crumpling operation comprise a reducing gear assembly linking the pulling wheels and the connecting wheels so that the pulling wheels rotate 1.9 times the rate of the connecting wheels. Due to the difference of speeds, the material is fed into the connecting wheels faster than the rotation of connecting wheels, the result being that the paper is compressed and crumpled without stresses.

There is consequently a combination of means and results, acting from rearward to forward, between the driving wheels, the reducing gear assembly and the connecting wheels, in order to make the final product, i.e. a pad-like product having a high cohesion, without risking any tearings.

This new design, contrary to the usual designs for this kind of machine, allows the use of paper of inferior quality, less expensive than kraft paper, for instance recycled paper of poor quality, which would not be possible in the typical machines mentioned above.

The present invention relates also to several improvements for the system described above.

Due to the fact that the driving is performed only by the rear wheels, while the connecting wheels do not exert a big pressure, it is possible to mount the axes of the support wheel and the smooth wheel on rocking levers upon which act springs positioned so that the actions of the springs are stronger rearward, i.e. for the driving function, than forward, i.e. for the connecting function. In practice, the two sets of wheels are mounted in a cradle with the axes of the pulling and castellated wheels being fixed within the cradle and reducing gear assembly linking them, whereas the support and the smooth wheel axes are placed along a rocking lever rotating backwards and forwards, and coacting with a set of two springs exerting pressure on a point of the rocking lever located between the rear end and the front end, at about a distance of ⅓ from the rear end.

The invention relates also to a simplified system providing for feeding the paper in the machine, ensuring an optimization of the quantity of material being fed into the whole mechanical system, which will be described hereinafter.

The present invention relates also to a method for making cushioning dunnage product from a multi-ply formed paper-like material, after having folded back the lateral edges on the central portion, by pulling downstream the material, crumpling it transversely, and compressing it along successive areas to maintain it. The main characteristic of the method is that all of the previous steps are made successively and separately. Preferably, the crumpling is the consequence of the braking of the material downstream of the driving stage, without any additional means acting directly on the material.

The invention further relates to a new cushioning dunnage product resulting from the above method, having a sufficient dunnage because of the crumpling and an excellent cohesion because of the connecting and of the compression, but being without weak areas; it is therefore possible to make it out of recycled paper, in particular.

According to another aspect of the invention, stock material for feeding into the above-described machine is provided wherein the layers of the material are glued in a variable width axial area by a gluing material applied according to a periodic curve, in the plan of the axial area, between the layers, the width of the area being adjustable by controlling the amplitude of the curve.

The curve is preferably sinusoidal like, preferably located centrally in relation with the transverse dimension of the layers.

One of the most interesting advantages of the material according to the invention is that all types of paper can be employed, and more particularly all different grammages. Thus, at least one of the layers or web may consist of Kraft paper.

When one of the two webs are made of Kraft paper, the latter can be chosen between all of the market available qualities.

As far as the glue saving is concerned, the glue is preferably applied discontinuously. This prevents moreover the glued area from getting too wet, and the attendant disadvantages described above.

The glue utilized in the present invention is preferably an emulsion of plastified homopolymeric polyvinyl acetate which dries quickly. This glue is also characterized by a high molecular weight and an average viscosity appropriate for papers.

The chosen papers can even be biodegradable and recyclable. Due to the aforementioned particularities, the chosen glue does not damage or weaken the papers, although they are generally considered as less solid, especially when they are moistened.

The multiply continuous paper-like band finally produced can then take several shapes for feeding a machine producing cushioning dunnage. It can be for instance wound around an axis to form a roll which is then continuously unwound to be folded and crumpled in the machine.

The invention relates also to a method for making such a band comprising the following steps:

unwinding the webs forming the layers parallel and at the same speed, the non identical central axes of the webs when unwound being in a plane perpendicular to the planes of the webs themselves;

gluing the facing sides of the webs, according to a periodic curve having an amplitude defining a gluing axial area;

bringing into contact the facing surfaces of the webs so that the central axes are merged.

The invention further relates to a mechanism for making the multilayer material of the invention, wherein the periodic curve drawn by the gluing material is performed on at least one layer by means of a buckled wheel having its periphery in contact on one hand with a system applying glue on the periphery and on the other hand with the layer, the buckled wheel being moved when the layers are being unwound, both speeds being then synchronized.

In order to save glue and also to prevent the low quality papers from being overly moistened, the buckled wheel is castellated. Thus, the periodic curve of the applied glue is discontinuous.

In the dunnage product made by the machine of the invention, the lateral edges of the stock material are folded inwardly, then crumpled, and the edges are finally connected in the central area of the band. This connecting operation is performed along an axial area having a predetermined width, corresponding approximately to the gluing area, and improves the quality of the crumpling of the dunnage product finally obtained.

According to yet another aspect of the invention, a method of making cushioning dunnage with the paper of the invention in the machine of the invention is provided. An elongated band of stock material is provided. The stock material has lateral edges and a longitudinal axis, and is formed from at least two elongated paper webs adhered together along the lengths of the webs by glue applied to one of the webs in a gluing area having a length along a longitudinal axis of the one web and a width transverse to the one web longitudinal axis, the transverse location of glue applied to the gluing area varying as a function of the longitudinal location along the gluing area. The band is driven longitudinally. The lateral edges of the band are folded laterally inwardly. The band is alternately crumpled longitudinally on first one side of the longitudinal axis of the band and then on the other side of the longitudinal axis of the band to form pleats in the band. The pleats in the band are connected by compressing the band through the thickness of the band.

The glue is preferably applied to the one web according to a periodic curve. The periodic curve is preferably sinusoidal. The glue is preferably applied to the one paper web centrally of the transverse dimension of the web. One of the paper webs may be Kraft paper. One of the paper webs may be made of biodegradable and recyclable paper. The glue may be applied discontinuously along the length of the periodic curve of application. The glue is preferably an emulsion of plastified homopolymeric polyvinyl acetate. The elongated band of stock material may be provided wound in a roll which is unwound as the band is driven longitudinally. The driving step and the connecting step of the method are preferably separate steps performed successively and independently of one another. The driving step is performed at a driving stage, the crumpling step is performed at a crumpling stage and the connecting step is performed at a connecting stage, and the crumpling step at the crumpling stage preferably occurs by virtue of the longitudinal speed of the band at the driving stage being greater than the longitudinal speed of the band at the connecting stage. The connecting step is preferably performed approximately across the width of the gluing area.

The invention also provides cushioning dunnage made according to the above methods.

Other objects and advantages of the invention will be apparent from the following description taken in conjunction with the accompanying drawings wherein:

DETAILED DESCRIPTION OF THE INVENTION

Figures 1, 2:
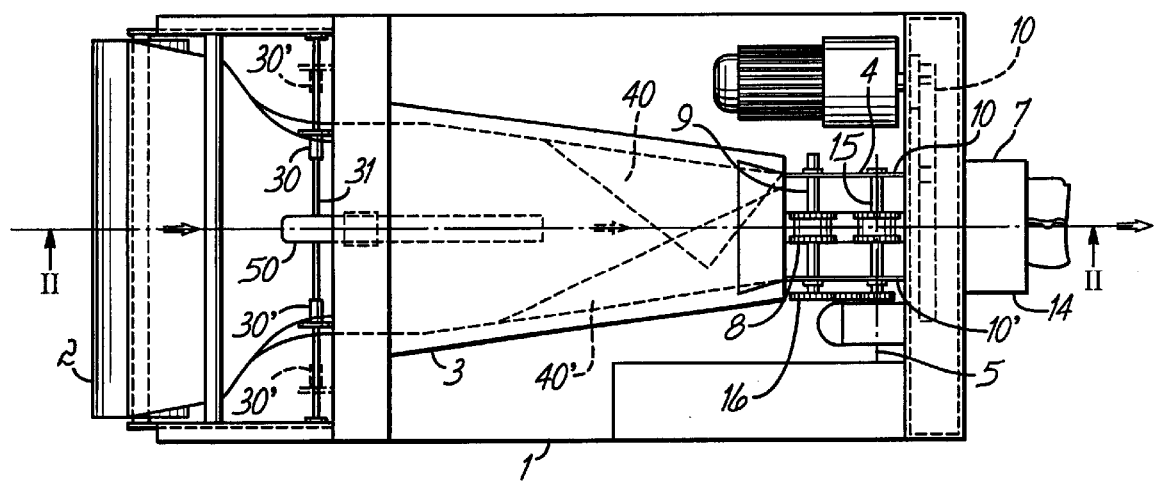
FIG. 1 is a top plan view of the machine according to the invention, including the sheet-like material.
FIG. 2 is a vertical sectional longitudinal view as seen along line II—II in FIG. 1.

Referring first to FIGS. 1 and 2, the components of the cushioning dunnage machine of the invention are illustrated.

A roll 2 of superimposed sheet-like paper is supported by a frame 1. A converging chute 3 which is shaped like a truncated pyramid, horizontally oriented forwards, is also supported by the frame 1. Driving components and crumpling and compression components, which will be described in more detail below, are mounted in a cradle 4 and are driven by a motor 5. A cutting device 6 and a tunnel-like element 7 are mounted to the frame 1 for extracting the dunnage product.

Figures 3, 4:
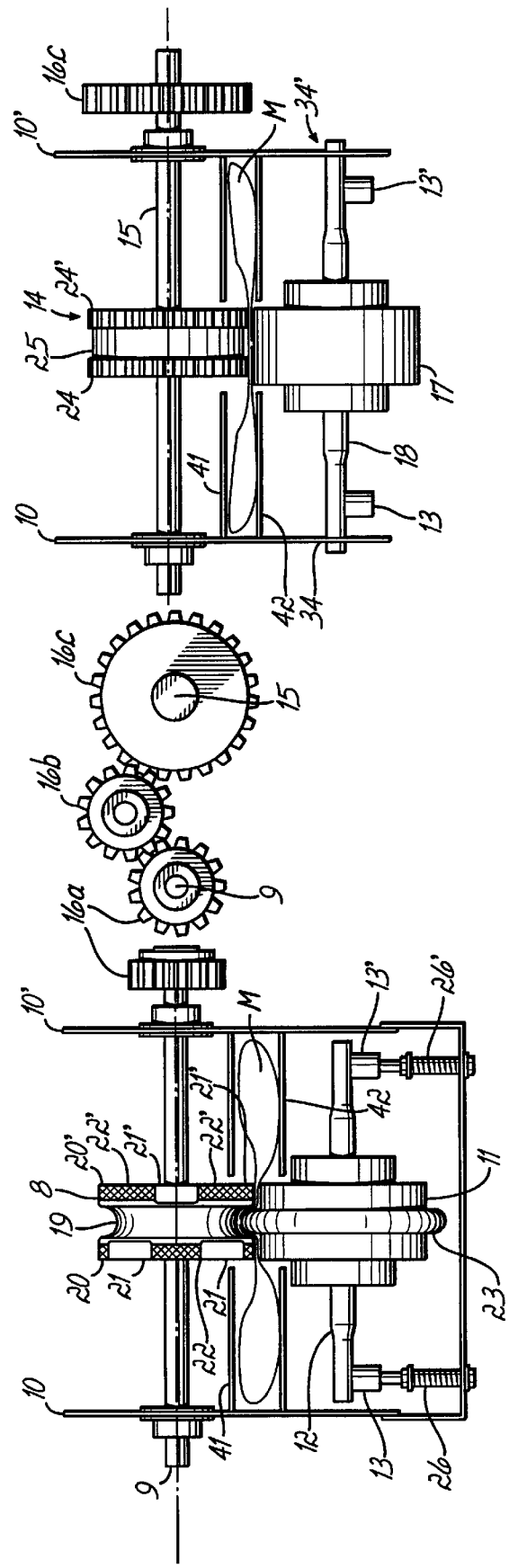
FIG. 3 is a transverse sectional view according to the axes of the driving wheels, as seen along line III—III in FIG. 2.
FIG. 4 is a transverse sectional view according to the axes of the connecting wheels, as seen along line IV—IV in FIG. 2.
Figure 5:
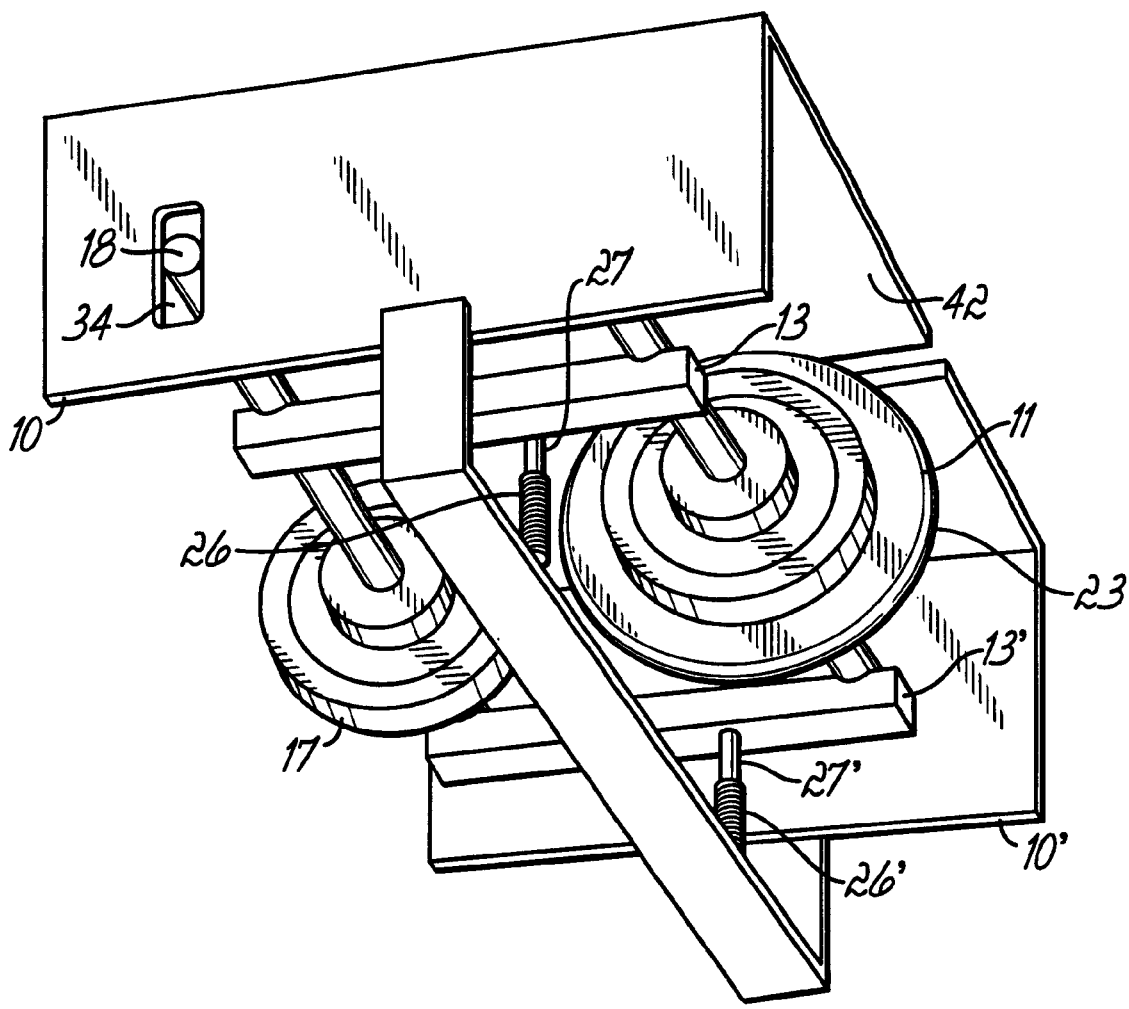
FIG. 5 is a partial perspective view of the cradle in which is mounted the mechanical system, seen from the bottom, the upper wheels being removed.

Referring now to FIGS. 3–5, the components mounted in the cradle 4, which are one particular aspect of the invention, are illustrated in more detail. More particularly, there is a first set of two superimposed wheels (FIG. 3) comprising an upper or driving wheel 8 rotating on an axis 9 mounted on lateral flanges 10,10' of the cradle 4, and a lower support wheel 11 rotating around an axis 12 supported by levers 13, 13'. These levers are mounted in such a way as to rock in a flexible manner in relation with the cradle 4 as represented in the FIG. 5, and will be described in more detail below.

A second set of two superimposed wheels (FIG. 4) comprises an upper wheel or compression wheel 14 rotating on an axis 15 mounted in the lateral flanges 10, 10' and driven by the motor 5, and a lower support wheel 17 rotating on an axis 18 also supported by the levers 13, 13' rocking in a flexible manner in relation to the cradle 4.

In the represented embodiment, both shafts having the corresponding axes 9 and 15 are driven by the motor 5, i.e. directly for the shaft of axis 15 and by means of a reducing assembly gear comprising the gear-like members illustrated as 16a, 16b, 16c for the shaft of axis 9 (FIGS. 3 and 4).

As seen in the FIG. 3, the driving or pulling wheel 8 is approximately cylindrical, and has a central portion 19 provided with an annular groove having a semi-circular section, and two edge portions 20, 20' having a cylindrical periphery regularly interrupted by flat parts or areas 21. The latter areas present the following characteristics: the flat parts 21 of the edge portion 20 face cylindrical areas 22' of the edge portion 20', whereas the flat parts 21' of the edge portion 20' face cylindrical areas 22 of the edge portion 20. The non-flat or cylindrical portions of the edge portions 20, 20' are knurled.

The support wheel 11 coacting with the driving wheel 8 is also cylindrical, but includes in its median portion a toric strip 23, having a section corresponding to the annular groove of the wheel 8.

The multi-ply formed material M issued from the converging chute 3, consisting in superimposed sheets the lateral edges of which are folded back on themselves, passes between the wheels 8 and 11, and is pulled downstream by the driving wheel 8. As represented in FIG. 3, the material M is nipped with varying force, as explained hereinafter, on the support wheel 11, when coming into contact with the cylindrical areas 22, 22' of the edge portions 20, 20', but becomes free when the flat parts 21, 21' pass in front. Due to the staggering of the flat parts of the two edge portions 20, 20', the band M is driven alternately by the two edge portions, on both sides with respect to the longitudinal axis of the band of material M. The material is consequently not pulled continuously in line with the longitudinal axis of the band M as is done in conventional dunnage machines, a process which can result in tears occurring in the central strip. Rather, the band M is pulled alternatingly on either lateral side of the longitudinal axis of the band M, a process which avoids such tears.

The movement resulting from successive nippings on one side of the longitudinal axis of the band M and then on the other side of that axis results in the creation of an excess of paper in the central strip, the excess being generated by the toric strip 23 inserted in the groove 19, and increasing the possibility of crumpling.

This driving or pulling mode of the present invention is new and is a part of the invention.

Referring now to FIG. 4, the compression wheel 14 is approximately cylindrical and includes two ridged edge-portions 24, 24' connected by a smooth median portion 25. The support wheel 17 is a smooth cylindrically-shaped wheel on the periphery of which the ribs 24, 24' rotate. The material M, issued from the first set of wheels 8, 11, is tightened between the ribs and the smooth surface, with a varying pressure, as described hereinafter. However, the compression is limited, in order to avoid damage to the material, since the latter is not deformed between the tooth of the gear-like members as in the previous systems. The ribs 24, 24', coacting with the material, ensure by the compression the connection of the several layers of the material and the cohesion of the product, by compressing the pleats formed in the paper.

An essential particularity of the second set of wheels is that it performs only the connecting function, and does not participate in the driving function. On the contrary, the second set of wheels brakes the movement of the advancing paper.

As represented in FIG. 5, the levers 13, 13' supporting the axes 12, 18 of the wheels 11, 18 respectively coact with springs 26, 26' exerting a force on points 27, 27' respectively located nearer the rear end of the levers, i.e. nearer the axis 12, than the forward end of the levers, i.e. axis 18. The exerted force is consequently distributed so that the pressure exerted by the wheel 11 is greater than the pressure exerted by the wheel 17. The difference is explained by the fact that the wheel 11 coacts with the driving wheel 8, and must consequently nip the multiply formed band M proportionally stronger than the wheel 17, which is only a support for the ribs 24, 24'.

The ratio of the forces can be in the range of ⅓–⅔, or can be chosen differently if desired, in modifying the location of the points 27,27'.

The connecting function and the adjustment mode of this function with respect to the driving function are also new and a part of the invention.

Lastly, according to another characteristic of the present invention, the crumpling function is not operated by gear-like members as in the previous devices, but by a mechanical system which does not affect the solidity of the material.

As it is symbolically suggested by the diagrammatical representation of the gears 16a, 16b and 16c forming a reducing gear assembly (FIGS. 3–4), the motor 5, driving the wheel 14, drives also the wheel 8 which rotates in the same direction but faster than the preceding wheel. As a result, the folded band M, when leaving the set of wheels 8, 11, is nipped by the wheels 14, 17 rotating slower. The material is then squeezed between the two sets of wheels, thus permanently creating transverse pleats, illustrated as P in the FIG. 2. The function of crumpling of the material M is performed by the difference in the rotational speeds of the two sets of wheels, as the driving wheel pair rotates faster than the connecting wheel pair. After experimentation, the preferred speed ratio chosen is 1.9. That can be for instance obtained by gears 16a, 16b provided with 20 teeth, whereas the gear 16c is provided with 38 teeth, the gear 16b only giving the same rotational direction to the gear 16c and then to the wheel 14 as the gear 16a.

Of course, this speed ratio can be adapted under other circumstances, for example to obtain the desired crumpling degree. This ratio is calculated for wheels 8,14 having the same diameter, but can also be changed for wheels of different diameters.

The main advantage of this characteristic is that, on the contrary to the previous devices, the crumpling of the material can be considered as "spontaneous", i.e. without further operations of elements able to damage the material, such as gear-like members as mentioned in the prior art, for example in U.S. Pat. No. 4,968,291, which can cause beginnings of tearings restricting the use of such devices only for high quality papers. However, the machine of the invention can work with ordinary quality papers, as for example recycled papers of lower quality.

As illustrated especially in FIG. 2, the product is made of paper issued from the roll 2, and passing through a guiding system folding the lateral edges on the central strip inwardly by mean of a simple and efficient system.

The latter includes firstly a pair of pulleys 30 provided with flanges, made for example of rubber and adjustably and rotatably mounted on a shaft 31, rocking around two arms pivoting around axis 32 according to the direction of the arrow F (FIG. 2). Thus, the access to the converging chute 3 can be freed in order to facilitate the loading of the paper-like material issued from roll 2. In this position, the pulleys 30 can be axially adjusted until the desired spacing is reached, for instance a predetermined spacing referred to as 30' can be selected, thus the pulleys can be adapted to the several qualities of paper used, which must be folded back according to different radii of curvature in the converging chute 3.

When the paper is inside the converging chute 3, the system 30, 31 is lifted up again by rocking it around axis 32 in a direction opposite to the arrow F, until reaching a vertical orientation (FIG. 2). In this position, the flanges facilitate the folding of the longitudinal edges of the multi-ply strip in order to fold those edges around a plate 33 placed inside the converging chute 3. Outside, downstream of the converging chute 3, and once the multi-ply material has been folded around the plate 33 and upon itself as described above, it is then nipped by the driving set of two wheels 8, 11 in the cradle 4.

The bottom of the converging chute 3 is made of two metal sheets 40, 40' obliquely cut in order to guide the lateral edges of the paper-like material during the folding operation.

The upper and lower plates of the converging chute 3 extend in 41 and 42, on each side of the sets of wheels 8, 11 and 14, 17, so that the multi-ply material is fully guided until it reaches the cutting device.

Plate 33 comprises a rear rounded portion 35 for receiving the band on its upper surface. The front portion of the plate 33 includes vertical triangular edge portions 36 intended to give additional volume to the edge portions of the cushioning dunnage product formed by the folding of the material M inside the converging chute 3.

A spring 50 is fixed on the rear portion of the upper wall of the converging chute 3 for maintaining the flanges 30 against the rounded portion 35 when the machine is working. This solution replaces all of the complicated devices equipping the previous machines, and is a part of the invention.

The elements which are common to the two paths are in first the entrance rolls 100, 200, and in second the carrying rolls 300, 400 driving the webs B1, B2. The path of the latter web B2 includes a section in which it is glued by the castellated wheel 500, which is itself in contact with a wheel 600 called a "paddling" wheel, partially submerged in a tray 700 filled with glue 800. The path of B2 passes moreover via a roll 900.

The path of B2 is tangential to the castellated wheel 500, between the roll 900 and the carrying roll 400, at the level of a metal sheet 1000 including a notch (FIGS. 7,8) allowing a contact between B2 and the wheel 500. The speed of the peripheral teeth of said wheel 500 is synchronous with the driving of B1, B2.

Figure 9:
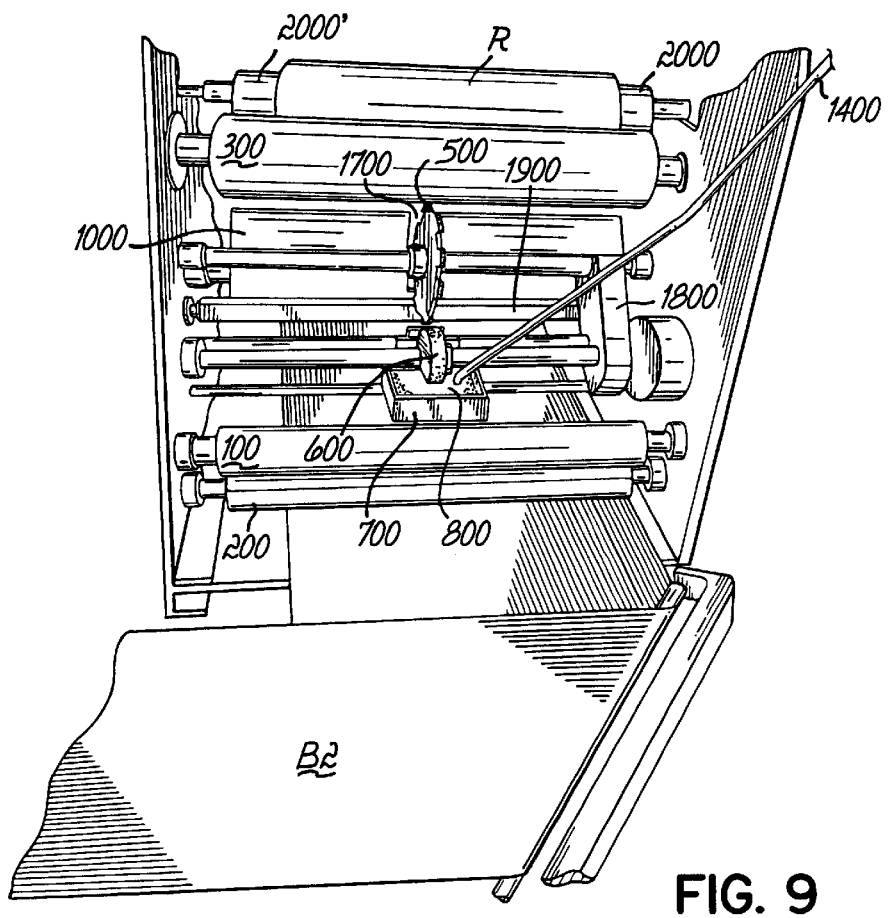
FIG. 9 is a perspective view of the entire device making double layer rolls, with only one web shown.

The metal sheet 1000 has moreover a particular function: it puts the web B2 away from said wheel 500, preventing it from getting glued in contact with the wheel when the glue dries, when the machine is not working. The separation results from a motion of the metal sheet, caused by jacks acting on a square-section pipe 1900, on which said metal sheet 1000 is mounted (FIG. 9).

Figure 6:
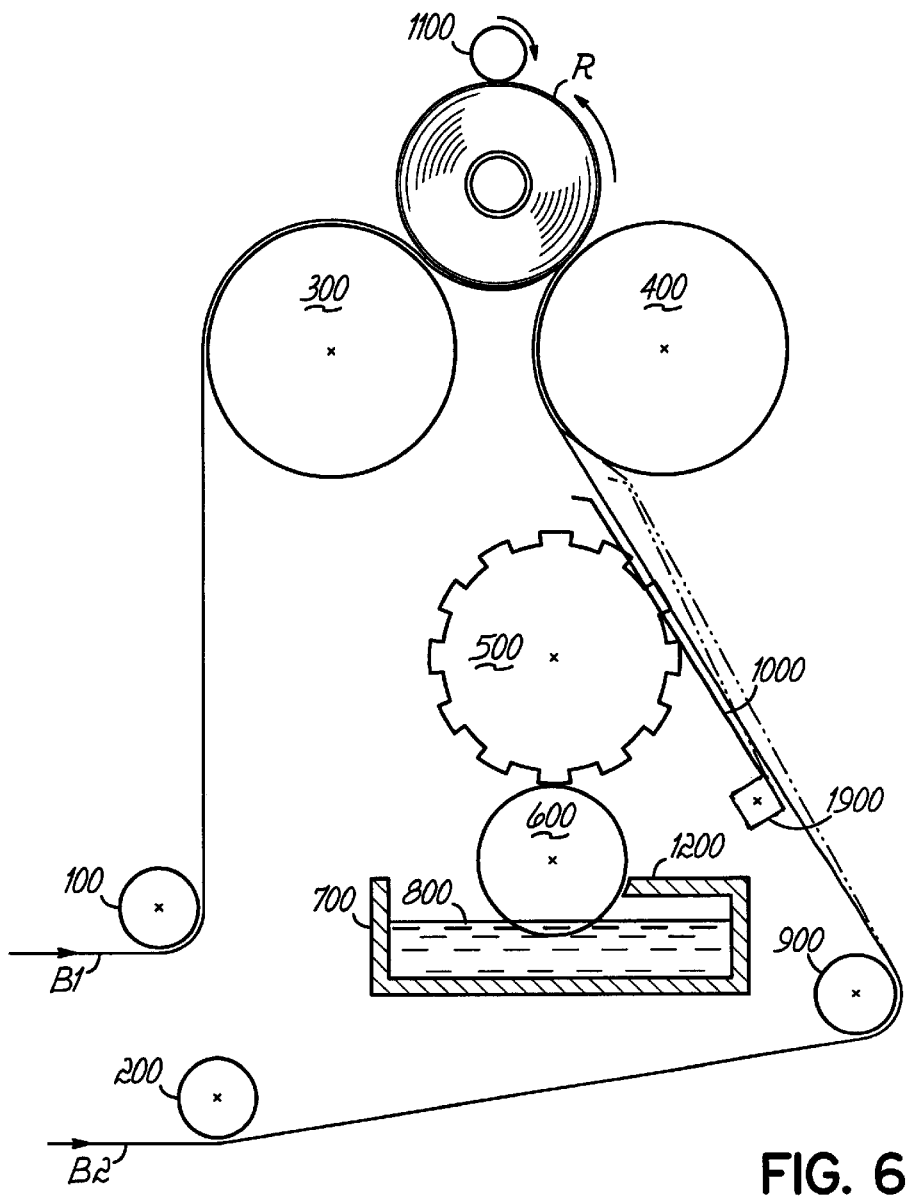
FIG. 6 is a diagrammatic sectional view of the production of the sheet-like stock material of the invention which is particularly suited for feeding into the machine of the invention, and more particularly is a diagrammatic sectional view of the paths followed by the two webs, showing the gluing device.

In the embodiment illustrated in FIG. 6, there is also a pressure roll 1100, always in contact with the wound roll R during the making period, as well as a device 1200 scraping the surplus of glue on the wheel 600. The castellated wheel covers its teeth with glue by tangential contact with the wheel 600 rotating also uniformly, so that the amount of glue is approximately identical on every tooth.

Figure 7:
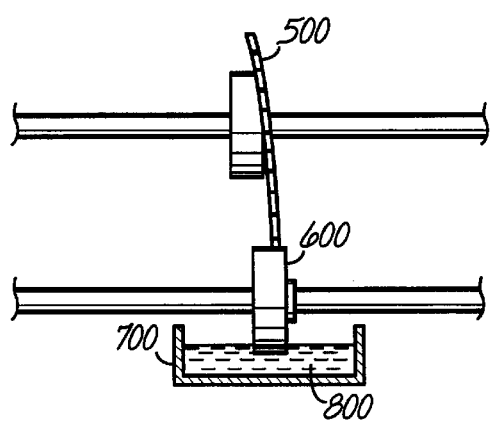
FIG. 7 is a front elevatiorial view of the gluing device.
Figure 10:
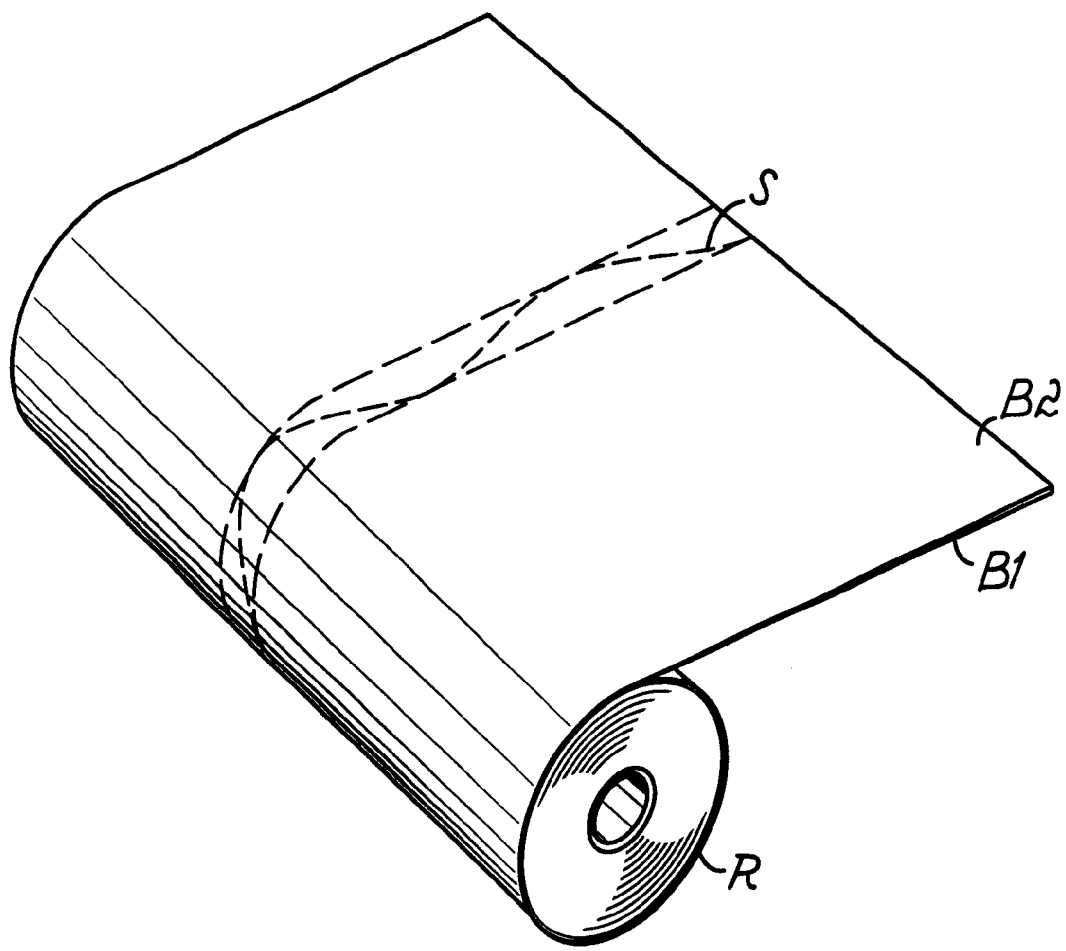
FIG. 10 is a perspective view of a roll of the stock material ready for feeding into the dunnage making machine.

FIG. 7 illustrates diagrammatically the shape of said wheel 500, which is buckled for distributing the glue according to a curve having a width equal to the amplitude of a sinusoidal curve. The width is also shown in FIG. 10 with the area referred to as S, defined by the dotted lines. The variation of the buckling of the wheel 500 imposes the variation of the width of the area S.

Figure 8:
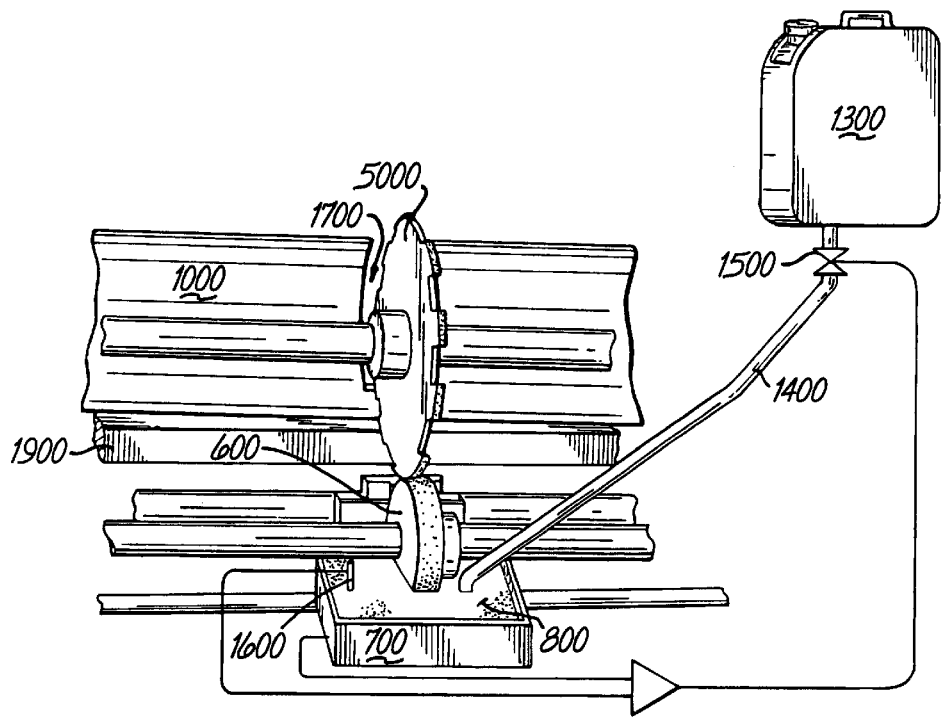
FIG. 8 is a perspective view, enlarged, of the device illustrated in FIG. 7.

FIG. 8 illustrates the same elements as in FIG. 7, in perspective view, but with a glue container 1300, linked to a tray 700 by a pipe 1400. The level of glue 800 in the tray 700 is measured and an electromagnetic gate or equivalent is then servocontrolled. The resistance between an electrode 1600 and the tray 700 is for instance measured, which of course is different if said electrode is partially or not submerged in the glue 800. This information, measured in a loop, is transmitted to the servocontrol of the electromagnetic gate 1500, as diagrammatically illustrated in FIG. 8.

The metal sheet 1000 is also shown in this Figure, in gray tint, including a notch 1700 allowing the band B2 (not shown in the Figure for clarity) to be tangential to the castellated wheel 500, and thus to be glued.

FIG. 9 illustrates an enlarged view of the device making the double layer material of the invention, with only one web (B2) shown to improve the clarity of the drawing.

The web B2 passes below the roll 200, which is itself located below the roll 100 guiding the web B1 (not shown). The latter changes its direction, of an angle of 90°, as well as the webs B2 as shown in the Figure. B1 comes however from the right part of the Figure, following a symmetrical embodiment. Thus, the winding machine of the invention has for instance two different rolls of one layer of paper-like web located symmetrically in relation to the driving axis at the level of the gluing device. In a first step, the unwinding paths are parallel, but the motions are opposite. After the changing of direction, the unwinding paths are still parallel, and the bands are driven in the same direction.

According to already known mechanisms, the wheels 500 and 600 are bound by a continuous link, such as a driving belt or a driving chain, housed in the casing 1800. The metal sheet 1000 is fixed at its bottom portion to the squared section pipe 1900 which can rotate of several degrees (FIG. 6).

The roll R is sustained by two rotating cones 2000, 2000' which can be translated according to two different axes, the first one being coaxial to the axis of the roll R, so that said roll R can be removed when it is finished, and the second one being perpendicular to the first one, allowing in particular the adaptation to the growth of the diameter of the roll.

FIG. 10 shows a roll with a glued, double-layer material wound, the gluing area being referenced as S. The area is limited by the dotted lines, which are of course imaginary, drawn for the purpose of illustration and clarity. The curve of the deposit of glue is also diagrammatically illustrated.

In this particular case, the two layers have the same width, but it is possible that one web be of a lesser width as compared to the width of the other web of the roll.

The invention concerns, of course, each step characterizing the method, which is new in itself, and claimed independently as being original. But the best results obtained by the machine of the invention are obtained by combining two or more of these steps. The invention claims consequently all of the possible combinations.

It is the same for all the characteristic components of the machine, which are claimed independently and in combination. The invention also concerns all of the steps or components which are equivalent to those above described as a possible example.

Many other combinations are still possible, according to dimensional criteria, or according to the various qualities of paper, or even according to the width of the glued area. The one skilled in the art can choose in relation to the machine which will be used for the making of the dunnage product.

What is claimed is:

1. A method of making cushioning dunnage comprising the steps of:

providing an elongated band of stock material having lateral edges and a longitudinal axis, the band of stock material being formed from at least two elongated paper webs, at least one of which is made of Kraft paper, adhered together along the lengths of the webs by glue applied to one of the webs in a gluing area having a length along a longitudinal axis of the one web and a width transverse to the one web longitudinal axis, the transverse location of glue applied to the gluing area varying as a function of the longitudinal location along the gluing area in order to avoid forming a straight line of glue parallel to the longitudinal axis of the one web;

driving the band longitudinally;

folding the lateral edges of the band laterally inwardly;

alternatingly crumpling the band longitudinally on first one side of the longitudinal axis of the band and then on the other side of the longitudinal axis of the band to form pleats in the band; and connecting the pleats in the band by compressing the band through the thickness of the band.

2. The method of claim 1 wherein the glue is applied to the one web according to a periodic curve.

3. The method of claim 2 wherein the periodic curve is a sinusoidal curve.

4. The method of claim 1 wherein the glue is applied to the one paper web centrally of the transverse dimension of the web.

5. The method of claim 1 wherein at least one of the paper webs is made of Kraft paper.

6. The method of claim 1 wherein at least one of the paper webs is made of biodegradable and recyclable paper.

7. The method of claim 2 wherein the glue is applied discontinuously along the length of the periodic curve of application.

8. The method of claim 1 wherein the glue is an emulsion of plastified homopolymeric polyvinyl acetate.

9. The method of claim 1 wherein the elongated band of stock material is provided wound in a roll and wherein the roll is unwound as the band is driven longitudinally.

10. The method of claim 1 wherein the driving step and the connecting step are separate steps, performed successively and independently of one another.

11. The method of claim 1 wherein the driving step is performed at a driving stage, the crumpling step is performed at a crumpling stage and the connecting step is performed at a connecting stage, and wherein the crumpling step at the crumpling stage occurs by virtue of the longitudinal speed of the band at the driving stage being greater than the longitudinal speed of the band at the connecting stage.

12. The method of claim 1 wherein the connecting step is performed approximately across the width of the gluing area.

13. Cushioning dunnage made according to any of claims 1–12.

* * * * *

UNITED STATES PATENT AND TRADEMARK OFFICE
CERTIFICATE OF CORRECTION

PATENT NO. : 6,534,148 B1
DATED : March 18, 2003
INVENTOR(S) : Baumuller

It is certified that error appears in the above-identified patent and that said Letters Patent is hereby corrected as shown below:

Column 1,
Line 31, for "BACDGROUND" insert -- BACKGROUND --
Line 52, for "multiply" insert -- multi-ply --

Column 2,
Line 8, for "kraft" insert -- Kraft --
Line 41, for "one" insert -- One --

Column 3,
Line 14, for "a an" insert -- an --

Column 4,
Line 11, for "kraft" insert -- Kraft --

Column 5,
Line 1, for "are" insert -- is --
Line 19, for "multiply" insert -- multi-ply --

Column 6,
Line 55, for "elevatiorial" insert -- elevational --

Column 8,
Line 16, for "tooth" insert -- teeth --
Line 36, for "multiply" insert -- multi-ply --

Column 9,
Line 19, for "mean" insert -- means --

UNITED STATES PATENT AND TRADEMARK OFFICE
CERTIFICATE OF CORRECTION

PATENT NO.     : 6,534,148 B1
DATED          : March 18, 2003
INVENTOR(S)    : Baumuller It is certified that error appears in the above-identified patent and that said Letters Patent is hereby corrected as shown below:

<u>Column 12,</u>
Line 30, delete "," between -- steps performed --

Signed and Sealed this

Twenty-third Day of November, 2004

JON W. DUDAS
*Director of the United States Patent and Trademark Office*